United States Patent
Yoon et al.

(10) Patent No.: US 9,249,530 B2
(45) Date of Patent: Feb. 2, 2016

(54) FIBER PREFORM ARCHITECTURE FOR COMPOSITE ARTICLES AND METHOD OF FABRICATION

(71) Applicant: General Electric Company, Schenectady, NY (US)

(72) Inventors: Yosang Yoon, Loudonville, NY (US); Mark Ernest Vermilyea, Niskayuna, NY (US); Teresa Tiashu Chen-Keat, Niskayuna, NY (US); Ming Xie, Beavercreek, OH (US)

(73) Assignee: General Electric Company, Niskayuna, NY (US)

( * ) Notice: Subject to any disclaimer, the term of this patent is extended or adjusted under 35 U.S.C. 154(b) by 218 days.

(21) Appl. No.: 13/906,127

(22) Filed: May 30, 2013

(65) Prior Publication Data

US 2014/0352838 A1   Dec. 4, 2014

(51) Int. Cl.
| | |
|---|---|
| *D03D 1/00* | (2006.01) |
| *B29B 11/16* | (2006.01) |
| *B29C 70/22* | (2006.01) |
| *B29C 70/30* | (2006.01) |
| *B29C 53/58* | (2006.01) |
| *B29C 53/60* | (2006.01) |
| *B29L 31/00* | (2006.01) |

(52) U.S. Cl.
CPC *D03D 1/00* (2013.01); *B29B 11/16* (2013.01); *B29C 53/582* (2013.01); *B29C 70/222* (2013.01); *B29C 70/30* (2013.01); *B29C 53/60* (2013.01); *B29L 2031/7504* (2013.01)

(58) Field of Classification Search
CPC .................................... Y10T 428/24058
USPC ............. 428/109, 98, 114, 105; 29/592
See application file for complete search history.

(56) References Cited

U.S. PATENT DOCUMENTS

| | | | |
|---|---|---|---|
| 4,385,952 A | | 5/1983 | Futakuchi et al. |
| 4,438,173 A | * | 3/1984 | Trost ............................ 428/221 |

(Continued)

FOREIGN PATENT DOCUMENTS

| | | |
|---|---|---|
| DE | 10 2011 080507 A1 | 2/2013 |
| EP | 1060069 A1 | 6/2002 |
| EP | 2353847 A1 | 10/2011 |

OTHER PUBLICATIONS

International Search Report issued in connection with WO Application No. PCT/US14/037854 dated Sep. 18, 2014.

(Continued)

*Primary Examiner* — Brent O'Hern
(74) *Attorney, Agent, or Firm* — John P. Darling (57) ABSTRACT

A fiber preform architecture and method of making, including a plurality of fiber bands. Each band of the plurality of fiber bands is placed at a time, at a predetermined position and orientation, to generate an interwoven and interlocking pattern between the fiber bands. Each of the plurality of fiber bands is formed of a plurality of fiber tows, positioned side by side at a predetermined spacing to define one or more gaps between each tow in the fiber band and define a secondary based interleaving within each of the fiber bands. The plurality of fiber bands are interwoven in an in-plane and out-of-plane orientation by interleaving each of the plurality of fiber bands with one or more of the plurality of fiber bands previously laid down and not in a common plane. The plurality of fiber bands include three or more different orientation angles and provide uniformity in coverage.

20 Claims, 7 Drawing Sheets

(56) References Cited

U.S. PATENT DOCUMENTS

| | | | |
|---|---|---|---|
| 4,671,841 A * | 6/1987 | Stephens | 156/292 |
| 6,579,815 B1 | 6/2003 | Popper et al. | |
| 7,246,990 B2 | 7/2007 | Xie et al. | |
| 7,390,161 B2 | 6/2008 | Xie et al. | |
| 7,713,021 B2 | 5/2010 | Finn et al. | |
| 8,002,919 B2 | 8/2011 | Johnson et al. | |
| 2008/0145215 A1 | 6/2008 | Finn et al. | |
| 2012/0034076 A1 | 2/2012 | Xie | |
| 2012/0321838 A1 | 12/2012 | Nagelsmit et al. | |
| 2014/0154437 A1 * | 6/2014 | Schroeder et al. | 428/34.1 |

OTHER PUBLICATIONS

Abdalla, M. et al., "Formulation of Composite Laminate Robustness Constraint in Lamination Parameters Space", 50th AIAA/ASME/ASCE/AHS/ASC Structures, Structural Dynamics, and Materials Conference <br>17th May 4-7, 2009, Palm Springs, California, pp. 1-15.

* cited by examiner

FIBER PREFORM ARCHITECTURE FOR COMPOSITE ARTICLES AND METHOD OF FABRICATION

BACKGROUND

The disclosure relates generally to gas turbine engines and, more particularly, to a fiber preform architecture for composite articles for gas turbine engines, such as composite fan containment cases, and methods of fabrication.

Gas turbine engines typically include high and low pressure compressors, a combustor, and at least one turbine. The compressors compress air, which is mixed with fuel and channeled to the combustor. The mixture is then ignited for generating hot combustion gases, and the combustion gases are channeled to the turbine, which extracts energy from the combustion gases for powering the compressor, as well as producing useful work to propel an aircraft in flight or to power a load, such as an electrical generator.

Gas turbine engines used in aircraft have a fan with a hub, and fan blades are disposed for rotation about a central axis. When engines operate in various conditions, foreign objects may be ingested into the engine. More specifically, various types of foreign objects may be entrained in the inlet of a gas turbine engine, ranging from large birds, to hailstones, sand and rain. The foreign objects may impact a blade resulting in a portion of the impacted blade being torn loose from a rotor. Catastrophic damage can occur to the aircraft and its occupants if a broken fan blade is propelled radially outwardly from the rotating hub under centrifugal force and impacts on the aircraft fuselage.

In an attempt to prevent such damage, it is common to include a generally cylindrical fan containment case about the periphery for containing the fan blade and any foreign objects. Fan containment cases may also be subject to foreign object damage that causes the rotor blade to pierce an engine fan case resulting in cracks along an exterior surface of the engine fan case. Additionally, foreign object damage may cause a portion of the engine to bulge or deflect resulting in increased stresses along the entire engine fan case. A fan containment case is typically fabricated from a metallic material which results in an increased weight of the engine and therefore the airframe. Fan containment cases made of composite materials combine excellent impact resistance and damage tolerance properties with significant weight reduction relatively to the metal case.

Composite laminates made by textile fabric (ex. woven, braid) are known to have superior damage tolerance compared to unidirectional laminates, and such textile fiber preforms are suitable for fiber architecture of a fan containment case shell to obtain containment capability. However, known composite fabrication processes using textile fabric generally involve manual processes and are not cost effective. The recent development of automated fiber placement (AFP) machine enables an automated and more cost effective method of producing composite components. However, conventional fiber placement processes cannot utilize textile fabric and generate unidirectional laminates by placing the fiber bands comprising longitudinal fibers and a resin adjacent to each other.

It would therefore be desirable to provide a novel textile fiber preform for composite articles, such as a fan containment case, and method of fabrication that provides high impact resistance and superior damage tolerance, without increasing the overall weight.

BRIEF DESCRIPTION

These and other shortcomings of the prior art are addressed by the present disclosure, which provides a textile fiber preform architecture for composite articles and method of fabrication.

One aspect of the present disclosure resides in a fiber preform architecture for composite articles comprising a plurality of fiber bands, each of the plurality of fiber bands placed at a time, at a predetermined position and orientation, to generate an interlocking pattern between fiber bands. Each of the plurality of fiber bands comprise a plurality of fiber tows, positioned side by side at a predetermined spacing to define one or more gaps between each tow in the fiber band. The plurality of fiber bands are interwoven in an in-plane and out-of-plane orientation by interleaving each of the plurality of fiber bands with one or more of the plurality of fiber bands previously laid down and not in a common plane to fill the one or more gaps and define a uniformly covered multi-layered assembly. The plurality of fiber bands include three or more different orientation angles.

Another aspect of the present disclosure resides in a fiber preform architecture for a composite article including a first fiber band oriented at a first orientation angle; a second fiber band oriented at a second orientation angle, wherein the second orientation angle is not equal to the first orientation angle; at least one additional band, each oriented at an additional orientation angle, wherein the additional orientation angle is not equal to the first orientation angle and the second orientation angle; and additional fiber bands disposed in a predetermined offset spaced relationship with the previously disposed plurality of fiber bands until one or more spacings formed between the previously disposed plurality of fiber bands is completely occupied by one or more subsequently disposed fiber bands. Each of the plurality of fiber bands is placed at a time and in a predetermined position and orientation, to generate an interwoven and interlocking pattern between the plurality of fiber bands. The plurality of fiber bands are interwoven in an in-plane and out-of-plane orientation by interleaving each of the plurality of fiber bands with one or more of the plurality of fiber bands previously laid down and not in a common plane.

Yet another aspect of the disclosure resides in a method of forming a fiber preform architecture for a composite article. The method including the steps of: a. depositing a first fiber band extending at a first orientation angle; b. depositing a second fiber band extending at a second orientation angle, different from 180° with respect to the first band, and wherein the second orientation angle is not equal to the first orientation angle; c. depositing at least one additional fiber band, each extending at an additional orientation angle, different from 180° with respect to the first fiber band and the second fiber band and wherein each of the additional orientation angles is not equal to the first orientation angle and the second orientation angle; d. repeating steps a-c such that each deposited fiber band has a predetermined spacing from a previously deposited fiber band deposited at an equivalent orientation angle; e. repeating step d until a plurality of deposited fiber bands cover an area uniformly and define a layer of fiber bands; and f. repeating step e until complete coverage is achieved by depositing an additional plurality of fiber bands such that each band placed during steps a-c is placed immediately adjacent to a respective fiber band with the same orientation angle placed during the deposition of the fiber bands in step a-c. The plurality of fiber tows and bands are interwoven in an in-plane and out-of-plane orientation by interleaving each of the fiber tows and bands with one or more of the fiber tows and bands previously laid down and not in a common plane.

Still another aspect of the disclosure resides in a method of forming a fiber preform architecture for a composite article including the steps of: a. depositing a first fiber band comprising a group of fiber tows disposed side by side at a predetermined spacing to define one or more gaps between each tow, the first fiber band extending at a first orientation angle; b. depositing a second fiber band comprising a group of fiber tows disposed side by side at a predetermined spacing to define one or more gaps between each tow in the second fiber band, the second fiber band extending at a second orientation angle, different from 180° with respect to the first band, and wherein the second orientation angle is not equal to the first orientation angle; c. depositing at least one additional fiber band, comprising a group of fiber tows disposed side by side at a predetermined spacing to define one or more gaps between each tow in the at least one additional band, the at least one additional fiber band extending at an additional orientation angle, different from 180° with respect to an orientation angle of a previously deposited fiber band and wherein the additional orientation angle is not equal to an orientation angle of a previously deposited fiber band; d. repeating steps a-c such that each deposited fiber band has a predetermined spacing from a previously deposited fiber band deposited at an equivalent orientation angle; e. repeating step d until a plurality of deposited fiber bands cover an area uniformly and define a layer of fiber bands; f. repeating step e until complete coverage is achieved by depositing an additional plurality of fiber bands such that each band placed during steps a-c is placed immediately adjacent to a respective fiber band with the same orientation angle placed during the deposition of the fiber bands in step a-c and define a layered assembly; and g. repeating steps a-f until complete coverage is achieved by disposing at least one additional layered assembly adjacent the previous deposited layered assembly to fill the one or more gaps and define a ply. The plurality of fiber tows and bands are interwoven in an in-plane and out-of-plane orientation by interleaving each of the fiber tows and bands with one or more of the fiber tows and bands previously laid down and not in a common plane.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

The disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). The terms "upper", "lower", "top", "bottom", "first", "second", or the like are intended for the purpose of orienting the reader as to specific components parts.

Moreover, in this specification, the suffix "(s)" is usually intended to include both the singular and the plural of the term that it modifies, thereby including one or more of that term (e.g., "the opening" may include one or more openings, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

A fiber preform architecture for composite articles and method of fabrication is described below. The method relates to making a composite textile fiber preform from a plurality of fiber bands that are interwoven, through interleaving, to provide improved strength. The method includes an automated fiber placement (AFP) process that utilizes individual fiber tows, groups of fiber tows, or slit tapes generally comprised of a plurality of longitudinally oriented fibers in a resin binder. In an embodiment, a plurality of individual fiber tows are formed into a fiber band that is deposited onto a tool surface. A textile type composite is fabricated via the layup of a plurality of the fiber bands, including varying orientations, according to a fiber placement process, so as to form a textile fiber preform. The use of AFP for the buildup of the plurality of layers, or plies, and more specifically, the ability to maneuver predetermined complex paths, provides for the fabrication of complex composite structures.

Figure 1:
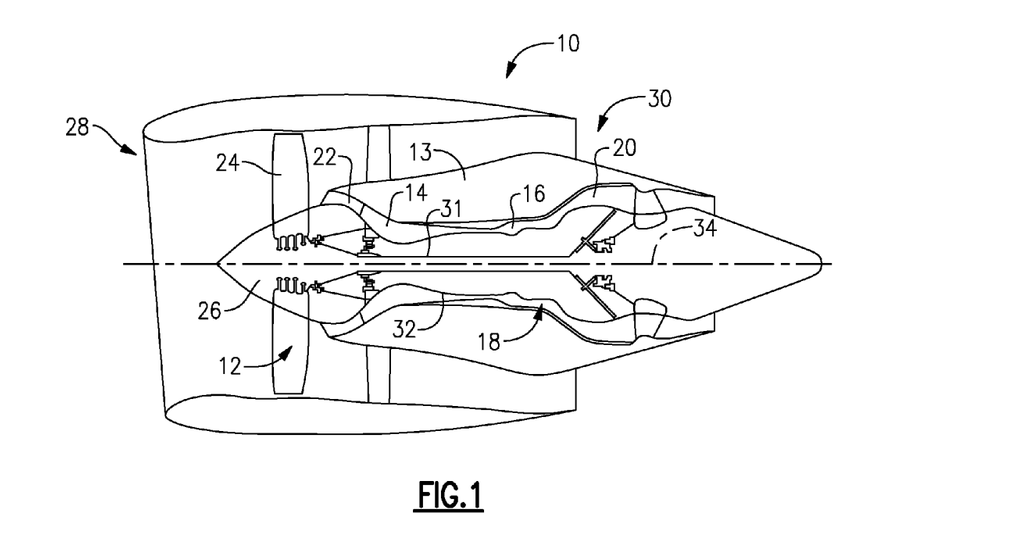
FIG. 1 is a schematic illustration of a gas turbine system in accordance with one or more embodiments shown or described herein.

As previously alluded to, the fiber preform architecture may be used to fabricate a preform for composite articles typically found in a gas turbine engine. Accordingly, a fan containment case 10 for a gas turbine engine 10, comprised of a fiber preform having an architecture as described here is initially described. FIG. 1 schematically illustrates a gas turbine engine 10. The gas turbine engine 10 includes a fan assembly 12 and a core engine 13 including a high-pressure compressor 14, and a combustor 16. The engine 10 also includes a high-pressure turbine 18, a low-pressure turbine 20, and a booster 22. The fan assembly 12 includes an array of fan blades 24 extending radially outward from a rotor disc 26. The engine 10 has an intake side 28 and an exhaust side 30. In one example, the gas turbine engine is a GE90 available from General Electric Company, Cincinnati, Ohio. The fan assembly 12 and turbine 20 are coupled by a first rotor shaft 31. The compressor 14 and turbine 18 are coupled by a second rotor shaft 32. The present disclosure is not limited to use in a specific gas turbine engine, and the engine shown in FIG. 1 is for illustrative purposes only.

During operation, air flows through fan assembly 12, along a central axis 34, and compressed air is supplied to high-pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
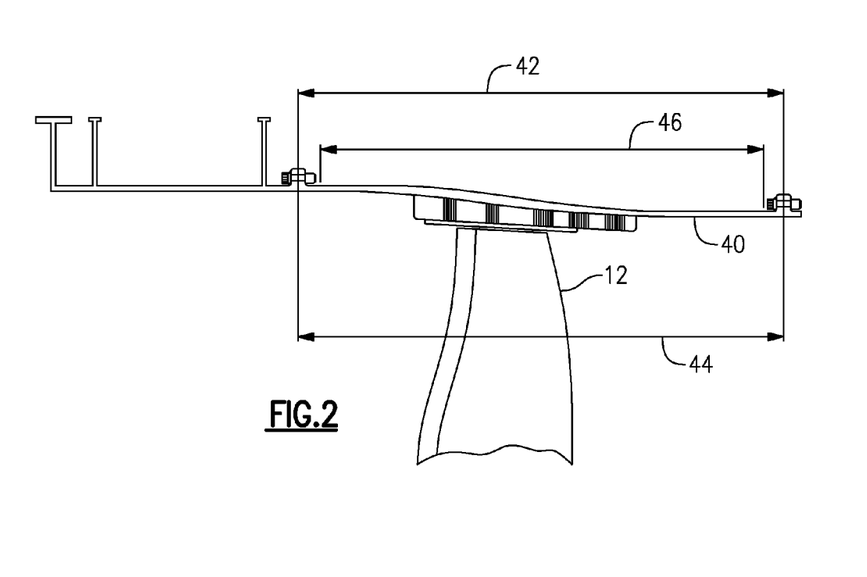
FIG. 2 schematically depicts a cross-section of an example fan containment case, in accordance with one or more embodiments shown or described herein.
Figure 3:
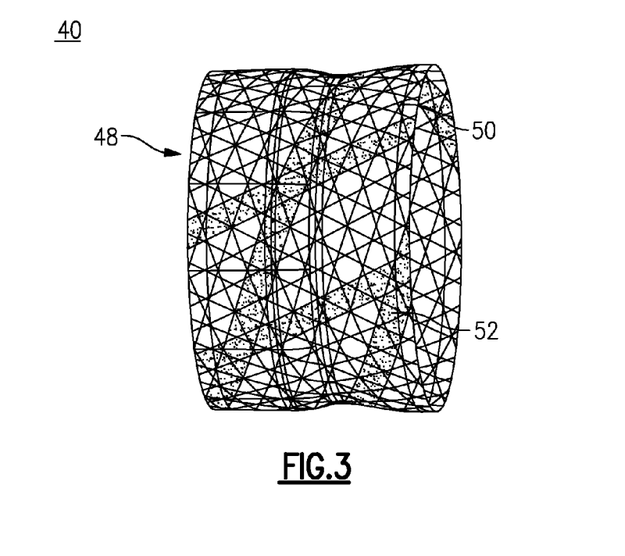
FIG. 3 schematically depicts a fiber preform architecture in accordance with one or more embodiments shown or described herein.

FIG. 2 is a schematic cross-section illustration of a fan containment case 40, and FIG. 3 is a schematic isometric illustration of a portion of fan containment case 40, and more particularly a fiber preform, fabricated according to the method described herein. Referring to FIG. 2, in an exemplary embodiment, the fan containment case 40 is a hardwall containment system with a length 42 that is approximately equal to a fan assembly length 44. More specifically, length 42 is variably sized, so that fan containment case 40 circumscribes a prime containment zone 46 of the fan assembly 12. The prime containment zone 46 as used herein is defined a zone extending both axially and circumferentially around the fan assembly 12 where a fan blade 24 is most likely to be ejected from fan assembly 12.

In the exemplary embodiment shown in FIG. 3, the fan containment case 40 includes a fiber preform 48 comprising a number of fiber bands 52, each including a plurality of fiber tows or slit tapes 50 as described herein. In particular embodiments, each of the fiber tows 50 comprise a group of fibers. More particularly, in an embodiment, the fiber tows comprise about 3,000 to about 50,000 fibers per tow. Typically, the strength of the fiber preform 48 is reduced when the fiber tows contain more than 50,000 fibers, while manufacturing costs increase when the fiber tows contain fewer than 3000 fibers. As shown for example in FIGS. 4 and 10, the fiber tows 50 are grouped into a number of bands 52 and form a number of radially disposed layers (described presently). The bands 52 are interwoven in an in-plane and out-of-plane orientation by interleaving each of the plurality of fiber bands 52 with one or more of a plurality of fiber bands 52 previously laid down and not in a common plane. As shown for example in FIGS. 4-10, each of the plurality of fiber bands 52 comprise a plurality of fiber tows 50, positioned side by side at a predetermined spacing to define one or more gaps 54 between each tow 50 in a respective fiber band 52. In an embodiment, the predetermined spacing between the fiber tows is an integer multiple of the tow width.

Figure 5:
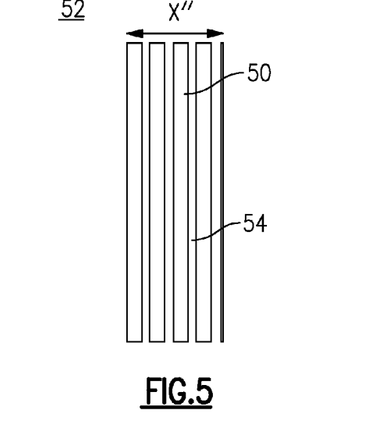
FIG. 5 schematically illustrates a plurality of fiber tows of a portion of an exemplary fiber band in accordance with one or more embodiments shown or described herein.
Figure 6:
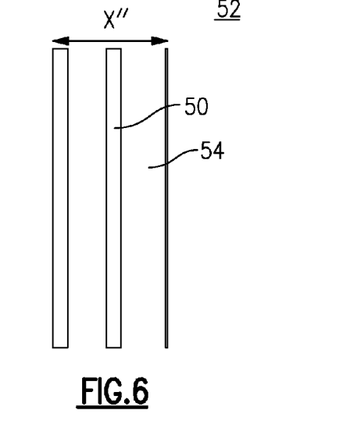
FIG. 6 schematically illustrates a plurality of fiber tows of a portion of an exemplary fiber band in accordance with one or more embodiments shown or described herein.

Each band 52 contains one or more fiber tows 50 in a binder, such as a resin. Each fiber tow 50 is defined by a fiber bundle with constant width. Referring more specifically to FIG. 5, in the illustrated example, the fiber band 52 is comprised of four fiber tows 50, separated by a plurality of gaps 54. In an embodiment, the fiber band 52 is approximately "x" inches wide and comprised of four fiber tows 52 and having a gap 54 therebetween each fiber tow 52. In an embodiment, x=2.0 inches and each gap 54 has a dimension of approximately 0.25 inches, so as to be approximately equal to a width of each individual tow 50. In an alternate embodiment as illustrated in FIG. 6, a band 52 may include a plurality of fiber tows 50 separated by a gap 54 having a dimension greater than the width of each individual tow 50.

Figure 7:
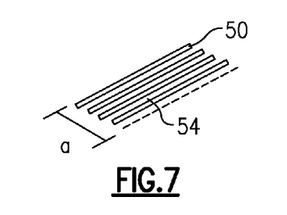
FIG. 7 schematically illustrates a plurality of fiber tows of a portion of an exemplary fiber band in accordance with one or more embodiments shown or described herein.
Figure 8:
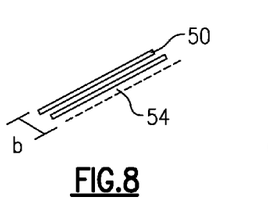
FIG. 8 schematically illustrates a plurality of fiber tows of a portion of an exemplary fiber band in accordance with one or more embodiments shown or described herein.
Figure 9:
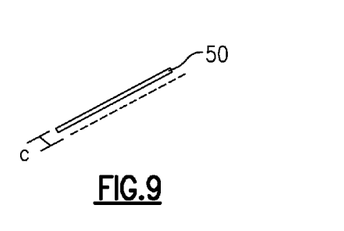
FIG. 9 schematically illustrates a plurality of fiber tows of a portion of an exemplary fiber band in accordance with one or more embodiments shown or described herein.

As best illustrated in FIGS. 7-9, each of the plurality of fiber bands 52 may be comprised of any number of tows 50 separated by a plurality of gaps 54. Referring now to FIG. 7, in an embodiment generally similar to the embodiment of FIG. 5, illustrated is a fiber band 52, wherein a width "a" is equal to approximately 2.0 inches, and includes four individual tows 50 having a gap 54 formed therebetween each. FIG. 8 illustrates a fiber band 52, wherein a width "b" is equal to approximately 1.0 inch, and includes two individual tows 50 having a gap 54 formed therebetween. FIG. 9 illustrates a fiber band 52, wherein a width "c" is equal to approximately 0.5 inch, and includes one tow 50 having a gap 54 formed adjacent thereto. It should be understood that while a plurality of fiber bands 52 have been illustrated and described as including a specific number of fiber tows 50 and comprising a specific dimensional width, this is not intended to be limiting and it should be understood that the plurality of fiber bands 52 may be comprised of any number of fiber tows 50 having a gap 52 formed therebetween each fiber tow 50.

In certain applications, it is desirable to use multiple fiber types to form the composite preform. Accordingly, for certain embodiments, at least one of the fiber tows 50 comprises a first material and at least one of the fiber tows comprises a second material. The fiber types may be mixed within a given layer, ply or different plies may be formed using different fiber types. In one example, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (e.g., Kevlar® and Twaron®), as well as oriented polyethylene fibers, such as Spectra® and Dyneem®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

In other applications, it is desirable to form mixed fiber type plies. Namely, at least one of the fiber bands 52 is formed using at least one tow 50 comprising the first material and at least one of the fiber bands 52 is formed using at least one tow 50 comprising the second material. For example, glass fibers may be interlaced with carbon (graphite) fibers to enhance the puncture resistance of the resultant composite article.

In other applications, the fiber tows 50 comprising the first and second materials are laid down on different regions of the fiber preform 48. For example, a high toughness fiber (such as Kevlar® or S-glass) may be laid down in the impact zones, while a high strength fiber (such as carbon fiber) is laid down in non-impact zones, within one or more plies.

Desirably, fabrication of the fiber preform 48, and thus fan containment case 40, is tailorable for protection against multiple size threats. For puncture resistance, the optimal unit cell size depends on the size of the penetrating object. For certain embodiments, at least one of the fiber bands 52 of tows 50 has a first width and at least one of the bands 52 of tows 50 has a second width, where the first and the second widths are different. For example, in an embodiment, the width of the bands 50 may vary from about 0.125 inches (0.3175 cm) to about 6 inches (15.24 cm). Smaller width bands protect against smaller projectiles, for example engine fragments, whereas larger width bands protect against larger projections, for example the leading edge of a fan blade. In addition, the tightness of the winding pattern may be adjusted.

In certain embodiments, interior components such as abradable or acoustic liners (not shown) are used as cylindrical mandrels for the fiber preform 48. For certain embodiments, the fiber preform 48 is disposed on an acoustic liner. For other embodiments, the fiber preform 48 is disposed on an abradable liner. Example abradable or acoustic liners are described in commonly assigned, U.S. Pat. No. 7,713,021, "Fan containment cases and Methods of Manufacture", dated May 11, 2010, which is incorporated by reference herein in its entirety.

Referring now to FIGS. 11-19, illustrated are consecutive steps in a method embodiment of the disclosure. As indicated, a method 70 of forming a fiber preform for composite articles, such as a fan containment case 40, includes disposing, such as by winding, a number of fiber bands 52, each comprised of one or more tows 50, on a tool 62 to build up a number of disposed layers 64. FIGS. 11-17 depict steps for disposing fiber bands 52 on the tool 62. Initially, a first fiber band 52a is deposited on tool 62 and extending at a first orientation angle $\alpha 1$, at step 72. Next, in a step 74, a second fiber band 52b is deposited. The second fiber band 52b is deposited so as to extend at a second orientation angle $\alpha 2$, different from 180° with respect to the first band 52a, and wherein the second orientation angle $\alpha 2$ is not equal to the first orientation angle $\alpha 1$.

A third fiber band 52c is next deposited, in a step 76. The third fiber band 52c is deposited so as to extend at a third orientation angle $\alpha 3$, different from 180° with respect to the first fiber band 52a and the second fiber band 52b and wherein the third orientation angle $\alpha 3$ is not equal to the first orientation angle gland the second orientation angle $\alpha 2$. In an embodiment, a fourth fiber band 52d is next deposited, in a step 78. The fourth fiber band 52d is deposited so as to extend at a fourth orientation angle $\alpha 4$, different from 180° with respect to the first fiber band 52a, the second fiber band 52b and the third fiber band 52c and wherein the fourth orientation angle $\alpha 4$ is not equal to the first orientation angle $\alpha 1$, the second orientation angle $\alpha 2$ and the third orientation angle $\alpha 3$. It should be understood that while the deposition of four fiber bands 52a, 52b, 52c and 52d, at four different orientation angles, $\alpha 1$, $\alpha 2$, $\alpha 3$, $\alpha 4$, respectively, to form the layer 64 is described herein, it is anticipated in an embodiment that the deposition of the plurality of fiber bands 52 at three orientation angles, thus including the deposition at more than three different orientation angles, may take place. As an example, an embodiment including the deposition of three fiber bands at 0°, 60° and −60° is contemplated herein.

Figure 12:
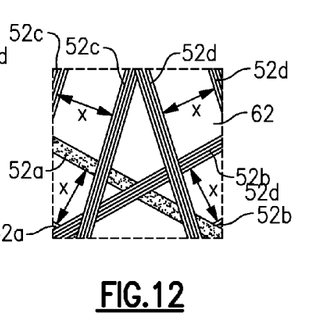
FIG. 12 schematically illustrates a step in a method for making a fiber preform architecture for composite articles in accordance with one or more embodiments shown or described herein.
Figures 13, 14:
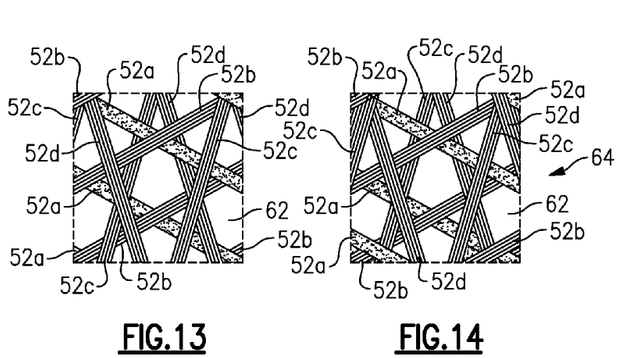
FIG. 13 schematically illustrates a step in a method for making a fiber preform architecture for composite articles in accordance with one or more embodiments shown or described herein.
FIG. 14 schematically illustrates a step in a method for making a fiber preform architecture for composite articles in accordance with one or more embodiments shown or described herein.

Next, in a step 80, steps 72-78 are repeated to form additional layers 64 as illustrated in FIG. 12, such that each deposited fiber band 52a, 52b, 52c, 52d, etc., has a predetermined spacing "x" from a previously deposited fiber band deposited at an equivalent orientation angle. It should be understood that the predetermined spacing "x" is an integer multiple of the tow width and may vary with respect to each orientation of the multiple bands 52. For example, the spacing "x" between first deposited fiber band 52a and subsequently deposited fiber band 52a, may not be equal to the spacing "x" between first deposited fiber band 52b and subsequently deposited fiber band 52b, and so forth. Steps 72-78 are repeated until a plurality of deposited fiber bands 52a, 52b, 52c, 52d, etc., fill all the fiber bands to a uniform whole fraction (e.g. ½ or ⅓) with the predefined spacings, as best illustrated in FIG. 13. Step 80 is repeated until the gaps created by the spacing "x" between the fiber bands 52 are completely covered In a step 82, step 80 is repeated until complete coverage is achieved by depositing an additional plurality of fiber bands 52a, 52b, 52c and 52d, as best illustrated in FIGS. 14-17, such that each band placed during the initial steps 72-80 is placed immediately adjacent, to a respective fiber band 50 with the same orientation angle placed during the subsequent deposition of additional fiber bands 50, as indicated by adjacently deposited fiber bands 52a-52a in FIG. 15. In step 82, step 80 is repeated until the spacing "x" between the fiber bands 52 are completely covered.

Figures 15, 16, 17:
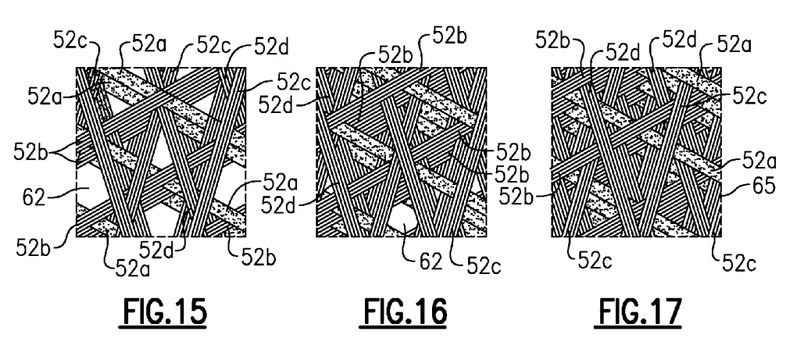
FIG. 15 schematically illustrates a step in a method for making a fiber preform architecture for composite articles in accordance with one or more embodiments shown or described herein.
FIG. 16 schematically illustrates a step in a method for making a fiber preform architecture for composite articles in accordance with one or more embodiments shown or described herein.
FIG. 17 schematically illustrates a step in a method for making a fiber preform architecture for composite articles in accordance with one or more embodiments shown or described herein.

Steps 72-82 generate multiple (n) layers of fiber bands 52 (including gaps 54) with multiple orientation angles (n) to form an interwoven and uniformly covered layered assembly 65 (FIG. 17). For the fiber band shown in FIG. 5, subsequent layered assemblies, each formed according to steps 72-82, are deposited next to the tow 50 in a previous layered assembly 65 to fill the gaps 54 and form a completely covered ply. When the gap 54 is larger than one tow 50 width as shown in FIG. 6, steps 72-82 are repeated to completely cover the gaps 54 and complete the ply.

In an embodiment, the first orientation angle $\alpha 1$ is equal to approximately 61°, the second orientation angle $\alpha 2$ is equal to approximately −61°, the third orientation angle $\alpha 3$ is equal to approximately 17° and the fourth orientation angle $\alpha 4$ is equal to approximately −17°. It should be understood that while specific orientation angles and four different of angles are stated, it is not intended to be limiting and that additional orientation angles are contemplated by this disclosure.

Figure 18:
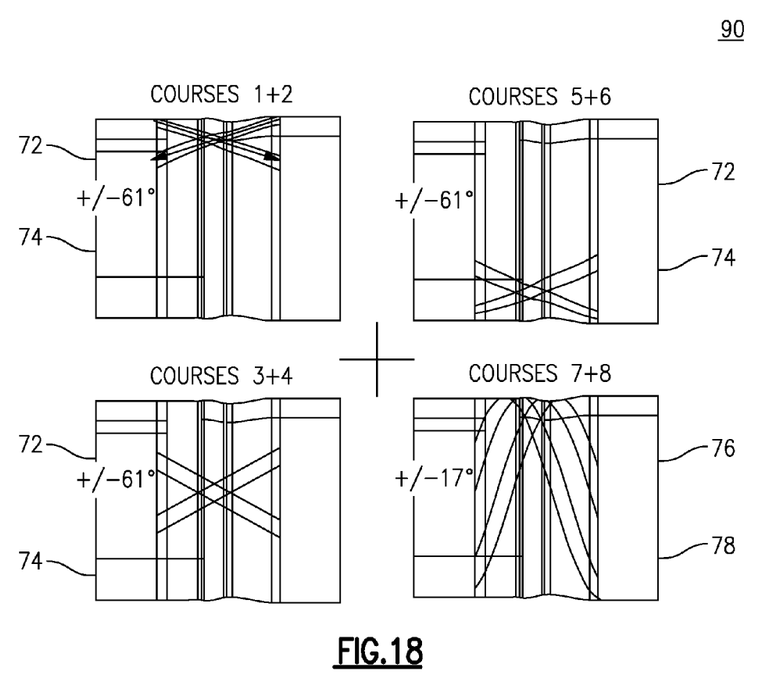
FIG. 18 schematically illustrates steps in a in a method for making a fiber preform architecture for composite articles in accordance with one or more embodiments shown or described herein.
Figure 19:
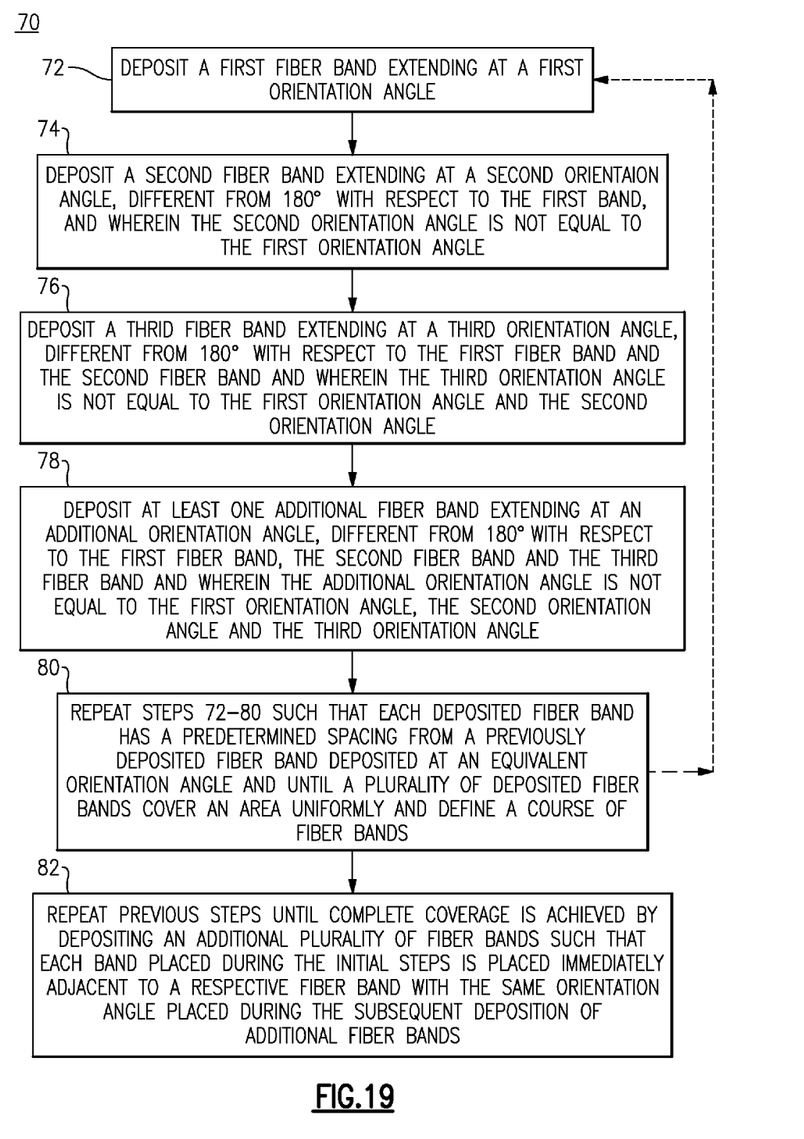
FIG. 19 schematically illustrates a method for making a fiber preform architecture for composite articles in accordance with one or more embodiments shown or described herein.

Based on a geometry of the desired resultant part, size, orientation angle and fiber band width, an alternative method 90 is disclosed and illustrated in FIG. 18. In the illustrated embodiment of method 90, each of steps 72-78, as previously described, may be repeated as a subset within the overall steps. For example, in an embodiment, for a cylindrical part, steps 72 and 74 may be repeated three times and then steps 76-78 may be performed so as to define a subset course. Steps 80 and 82 would then be performed as stated thereafter.

Referring again to FIG. 11, as shown, multiple fiber tows 50 are brought together and then laid down as a band 52 on the tool 62 to form the fiber preform 48. Depending on the application, the same or different fiber types may be used, non-limiting examples of which include carbon (graphite) fibers and glass fibers, as discussed above.

In certain embodiments, the thermosetting resin is cured at certain stages in the fiber laying down process. In other embodiments, the thermosetting resin is cured at the end of the laying down process. The curing technique may vary depending on the type of resin used, but non-limiting examples of curing techniques include heating the resin, or exposing the resin to ultraviolet (UV) radiation. One common example of heating is accomplished by application of infrared (IR) radiation to the resin or by placement in an enclosed oven or autoclave. The resin chemistry will dictate the type of curing technique that can be used.

Figure 4:
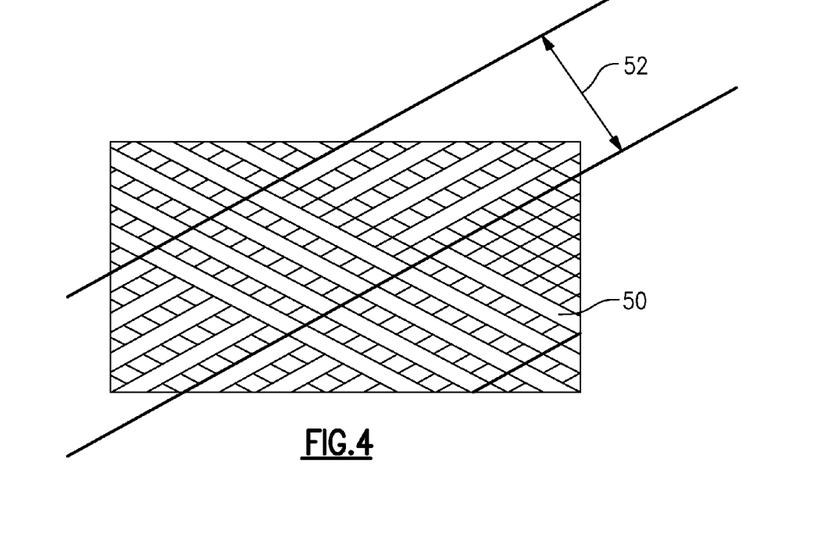
FIG. 4 schematically illustrates a partially completed layup showing a portion of an exemplary fiber band in accordance with one or more embodiments shown or described herein.
Figure 10:
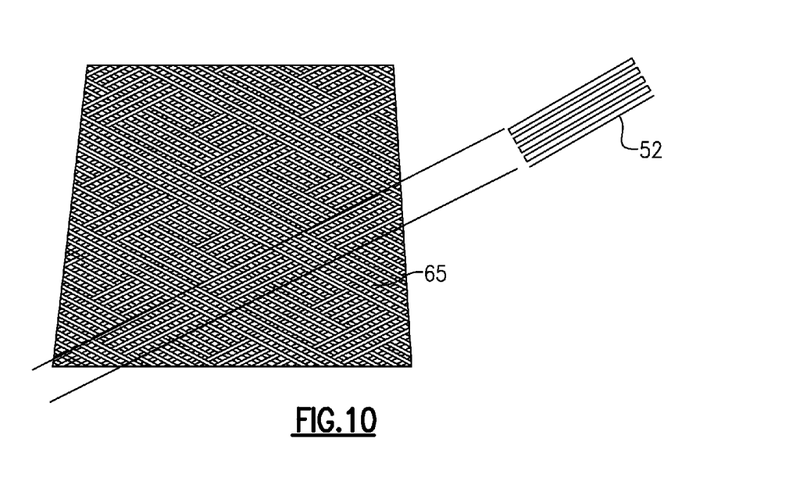
FIG. 10 schematically illustrates a portion of a plurality of fiber bands in accordance with one or more embodiments shown or described herein.
Figure 11:
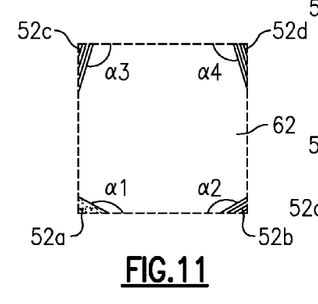
FIG. 11 schematically illustrates a step in a method for making a fiber preform architecture for composite articles in accordance with one or more embodiments shown or described herein.

For the exemplary embodiment, as best illustrated by FIGS. 3, 4 and 17, the steps comprise grouping the fiber tows 50 into a number of bands 52 and interweaving in an in-plane and out-of-plane orientation by interleaving each of the plurality of fiber bands 52 with one or more of the plurality of fiber bands 52 previously laid down and not in a common plane to form a winding pattern. The gaps 54 in each of the fiber bands 52, as shown in FIGS. 5-9, generate a secondary, fiber tow 50 based, interleaving within the band 52 as best illustrated in FIGS. 4 and 10. This interleaving may form at least one winding pattern along at least a portion of one or more of the layers 64. For example, as previously described with reference to FIGS. 7-9, the fiber tows 50 are grouped to form the fiber bands 52. The width of the bands 52 can be adjusted by including more or less tows 50 in each of the fiber bands 52. In addition, the tightness of the winding pattern may be adjusted to vary the winding pattern.

There are many benefits of the above-described fiber preform architecture and fan containment cases formed including said architecture and methods of manufacture. Such benefits include impact resistance to large and small threats, added strength, decrease in delamination of the plies and the overall ability to incorporate a variety of features, such as different materials, different tow thicknesses and different winding patterns into the cases. Other benefits include reduced case weight, ease of manufacturing, and potential cost savings.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A fiber preform architecture for a composite article comprising:
    a plurality of fiber bands, each of the plurality of fiber bands placed one at a time and discontinuous from all other bands, at a predetermined position and orientation, to generate an interlocking pattern between the plurality of fiber bands,
    wherein each of the plurality of fiber bands comprise a plurality of fiber tows, positioned side by side at a predetermined spacing to define one or more gaps between each tow in the fiber band,
    wherein the plurality of fiber tows and bands are at least partially interlocked across one or more planes through a thickness of the fiber preform by interleaving each of the plurality of fiber tows and bands with one or more of the plurality of fiber tows and bands previously laid down and not in a common plane, and wherein the plurality of fiber tows and bands above and below each of the one or more gaps maintain their relative position with respect to each other, to fill the one or more gaps and define a uniformly covered multi-layered assembly, and
    wherein the plurality of fiber bands include three or more different orientation angles.

2. The fiber preform architecture as claimed in claim 1, wherein a first orientation angle is 0°, a second orientation angle is 60° and a third orientation angle is −60°.

3. The fiber preform architecture as claimed in claim 1, wherein a first orientation angle is 61°, a second orientation angle is −61°, a third orientation angle is 17° and a fourth orientation angle is −17°.

4. The fiber preform architecture as claimed in claim 1, wherein the composite article is a fiber preform for a composite fan containment case.

5. A fiber preform architecture for a composite article including a plurality of fiber bands defining a multi-layered assembly comprising:
    a first fiber band oriented at a first orientation angle;
    a second fiber band oriented at a second orientation angle, wherein the second orientation angle is not equal to the first orientation angle;
    at least one additional band, each oriented at an additional orientation angle, wherein the additional orientation angle is not equal to the first orientation angle and the second orientation angle; and
    additional fiber bands disposed in a predetermined offset spaced relationship with the previously disposed plurality of fiber bands until one or more spacings formed between the previously disposed plurality of fiber bands is completely occupied by one or more subsequently disposed fiber bands, wherein each of the plurality of fiber bands is placed one at a time and discontinuous from all other bands and in a predetermined position and orientation, to generate an interlocking pattern between the plurality of fiber bands, wherein each of the plurality of fiber bands comprise a plurality of fiber tows, positioned side by side at a predetermined spacing to define one or more gaps between each tow in the fiber band, and wherein the plurality of fiber bands are at least partially interlocked across one or more planes through a thickness of the fiber preform by interleaving each of the plurality of fiber bands with one or more of the plurality of fiber bands previously laid down and not in a common plane, and wherein the plurality of fiber tows and bands above and below each of the one or more gaps maintain their relative position with respect to each other, to fill the one or more gaps and define a uniformly covered multi-layered assembly.

6. The fiber preform architecture as claimed in claim 5, wherein the first orientation angle is 0°, the second orientation angle is 60° and a third orientation angle is −60°.

7. The fiber preform architecture as claimed in claim 5, wherein the first orientation angle is 61°, the second orientation angle is −61°, a third orientation angle is 17° and a fourth orientation angle is −17°.

8. The fiber preform architecture as claimed in claim 5, wherein each of the plurality of fiber bands comprise a plurality of fiber tows, positioned side by side at a predetermined spacing to define the one or more gaps between each tow in a respective fiber band.

9. The fiber preform architecture as claimed in claim 5, wherein the composite article is a fiber preform for a composite fan.

10. Method for making a fiber preform for a composite article comprising the successive steps of:
   a. depositing a first fiber band extending at a first orientation angle;
   b. depositing a second fiber band extending at a second orientation angle, different from 180° with respect to the first band, and wherein the second orientation angle is not equal to the first orientation angle;
   c. depositing at least one additional fiber band, each extending at an additional orientation angle, different from 180° with respect to the first fiber band and the second fiber band and wherein each of the additional orientation angles is not equal to the first orientation angle and the second orientation angle;
   d. repeating steps a-c such that each deposited fiber band has a predetermined spacing from a previously deposited fiber band deposited at an equivalent orientation angle;
   e. repeating step d until a plurality of deposited fiber bands cover an area uniformly and define a layer of fiber bands; and
   f. repeating step e until complete coverage is achieved by depositing an additional plurality of fiber bands such that each band placed during steps a-c is placed immediately adjacent to a respective fiber band with the same orientation angle placed during the deposition of the fiber bands in step a-c, wherein each of the plurality of fiber bands in step a-c comprise a plurality of fiber tows, positioned side by side at a predetermined spacing to define one or more gaps between each tow in the fiber band, wherein each of the plurality of fiber bands in step a-c is placed one at a time and discontinuous from all other bands and in a predetermined position and orientation, to generate an interlocking pattern between the plurality of fiber bands, and wherein the plurality of fiber tows and bands are at least partially interlocked across one or more planes through a thickness of the fiber preform by interleaving each of the fiber tows and bands with one or more of the fiber tows and bands previously laid down and not in a common plane, and wherein the plurality of fiber tows and bands above and below each of the one or more gaps maintain their relative position with respect to each other, to fill the one or more gaps and define a uniformly covered multi-layered assembly.

11. The method of claim 10, further comprising repeating steps a-b prior to commencing step c.

12. The method of claim 10, wherein each of the first fiber band, the second fiber band and the at least one additional fiber band comprise a group of fiber tows disposed side by side at a predetermined spacing to define one or more gaps between each tow.

13. The method of claim 10, wherein the first orientation angle is 0°, the second orientation angle is 60° and a third orientation angle is −60°.

14. The method of claim 10, wherein the first orientation angle is 61°, the second orientation angle is −61°, a first additional orientation angle is 17° and a second additional orientation angle is −17°.

15. The method of claim 10, wherein the composite article is a fiber preform for a composite fan containment case.

16. Method for making a fiber preform for a composite article comprising the successive steps of:
   a. depositing a first fiber band comprising a group of fiber tows disposed side by side at a predetermined spacing to define one or more gaps between each tow, the first fiber band extending at a first orientation angle;
   b. depositing a second fiber band comprising a group of fiber tows disposed side by side at a predetermined spacing to define one or more gaps between each tow in the second fiber band, the second fiber band extending at a second orientation angle, different from 180° with respect to the first band, and wherein the second orientation angle is not equal to the first orientation angle;
   c. depositing at least one additional fiber band, comprising a group of fiber tows disposed side by side at a predetermined spacing to define one or more gaps between each tow in the at least one additional band, the at least one additional fiber band extending at an additional orientation angle, different from 180° with respect to an orientation angle of a previously deposited fiber band and wherein the additional orientation angle is not equal to an orientation angle of a previously deposited fiber band;
   d. repeating steps a-c such that each deposited fiber band has a predetermined spacing from a previously deposited fiber band deposited at an equivalent orientation angle;
   e. repeating step d until a plurality of deposited fiber bands cover an area uniformly and define a layer of fiber bands;
   f. repeating step e until complete coverage is achieved by depositing an additional plurality of fiber bands such that each band placed during steps a-c is placed immediately adjacent to a respective fiber band with the same orientation angle placed during the deposition of the fiber bands in step a-c and define a layered assembly; and
   g. repeating steps a-f until complete coverage is achieved by disposing at least one additional layered assembly adjacent the previous deposited layered assembly to fill the one or more gaps and define a ply, wherein each of the plurality of fiber bands in step a-c comprise a plurality of fiber tows, positioned side by side at a predetermined spacing to define one or more gaps between each tow in the fiber band, wherein each of the plurality of fiber bands in step a-c is placed one at a time and discontinuous from all other bands and in a predetermined position and orientation, to generate an interlocking pattern between the plurality of deposited fiber bands, and wherein the plurality of fiber tows and bands are at least partially interlocked across one or more planes through a thickness of the fiber preform by interleaving each of the fiber tows and bands with one or more of the fiber tows and bands previously laid down and not in a common plane, and wherein the plurality of fiber tows and bands above and below each of the one or more gaps maintain their relative position with respect to each other, to fill the one or more gaps and define a uniformly covered multi-layered assembly.

17. The method of claim 16, further comprising repeating steps a-b prior to commencing step c.

18. The method of claim 16, wherein the first orientation angle is 0°, the second orientation angle is 60° and a third orientation angle is −60°.

19. The method of claim 16, wherein the first orientation angle is 61°, the second orientation angle is −61°, a first additional orientation angle is 17° and a second additional orientation angle is −17°.

20. The method of claim 16, wherein the composite article is a fiber preform for a composite fan containment case.

\* \* \* \* \*